Patented Sept. 18, 1945

2,385,283

UNITED STATES PATENT OFFICE 2,385,283

PRODUCTION OF ITACONIC ACID

Jasper H. Kane, Garden City, Alexander C. Finlay, Long Island City, and Philip F. Amann, Brooklyn, N. Y., assignors to Chas. Pfizer & Co., Inc., Brooklyn, N. Y., a corporation of New Jersey No Drawing. Application November 25, 1942, Serial No. 466,944

7 Claims. (Cl. 195—36)

This invention relates to the production of itaconic acid and its salts by a new and improved process.

Itaconic acid is by no means a new substance. As a decomposition product of citric acid or of aconitic acid, it has been known for more than one hundred years. An article by S. Baup in Ann. 19: 29–38 (1837) described its isolation from the products of pyrolysis of citric acid, and clearly characterized it by melting point, solubility, etc., although Baup used the name "citricic acid." Crasso in 1840 supplied the name "itaconic acid," and in the 1880's several investigators, including no less a person than Max Klinger, referred to the capacity of its esters for resin formation. The polymerization of ethyl itaconate by light was studied by Stobbe and Lippold (J. prakt. Chem. 9s 336–44, 1914).

With this early introduction, it is not surprising that numerous attempts have been made to prepare the acid efficiently. Fittig in 1877 (Ann. 188: 72) obtained a yield of some 21% by destructive distillation of citric acid. Shriner and others (Organic Syntheses XI: 70–2, 1931) claim yields up to 47% of the citric acid consumed, but warn that the process is not applicable to quantities exceeding one mole. Kono Kinoshita in 1931 isolated from dried and salted plums a fungus which was capable of fermenting sugars to itaconic acid in yields up to 24%, based on sugar consumed (Acta Phytochim. Japan 5: 272). He simulated the natural habitat of the microorganism as closely as possible, using concentrated sugar solutions containing a high percentage of chlorides and, of course, surface growth conditions. In so far as we have been able to ascertain, Kinoshita's process was never developed upon a commercial scale.

In the meantime, E. Hope (U. S. Pat. 1,644,131, of 1925) invented an unsplinterable glass consisting of two layers of glass cemented to an intervening sheet of transparent cellulose acetate by means of polymerized dialkyl itaconate esters. Hope also described glass-like plastics consisting of polymerized itaconic esters, which on account of their brilliance, clarity and high refractive index were eminently suited to the manufacture of lenses, artificial jewelry, etc.

Although Calam and others (Biochem. J. 33: 1488–95, 1939) found a fungus which produced some itaconic acid by fermentation of carbohydrates under more usual conditions than those tried by Kinoshita, their process was still confined to surface growth. Calam's yields appear to have been distinctly less than those claimed by Kinoshita. U. S. Pat. No. 2,088,347 (Scheuing and Walach to C. H. Boehringer Sohne, A. G.) and U. S. Pat. No. 2,258,947 (J. H. Crowell to National Aniline and Chemical Co.) describe improvements in the manufacture of itaconic acid from the relatively expensive citric acid as a raw material, but none of these processes appear to have achieved commercial success.

We have now found that selected fungus strains by submerged aerobic growth in a nutrient-containing substrate can be made to produce itaconic acid in a commercially practicable way.

Aerobic conditions are maintained by suitable mechanical agitation, passing a stream of air (or a mixture of oxygen-containing gases) through the medium, or both. The fermentation may be conducted at atmospheric or higher pressure. The temperatures suitable are those at which the microorganisms are accustomed to grow, which are found to be between 20 and 40° C. The exact composition of the medium may vary over a considerable range, but should always include a carbohydrate as its principal constituent. Various combinations of the carbohydrate with commonly used nutrients, such as ammonium salts, nitrates, urea, amino acids, potassium salts, magnesium salts, phosphates, etc., will suggest themselves to one skilled in the art.

By carbohydrates we refer to a class of neutral compounds belonging to the groups of sugars, starches and their derivatives; more specifically glucose, fructose, sucrose, invert sugar, maltose, molasses and syrups, the various starches, grains, malted grains, cereal products and other materials containing any of the above substances. In some cases it is advantageous to pretreat the solution by processes known in the art.

The microorganisms which we have found suitable for our aerobic, submerged fermentation are the mycetes, as outlined on page 2 of the book, "An Introduction to Industrial Mycology," by Smith and Raistrick (London, Edward Arnold and Co., 1938), that is, Myxomycetes, Schizomycetes and Eumycetes. Especially suitable are the Aspergilli, and more especially certain strains of the species *Aspergillus terreus*, but we wish to emphasize that in any case itaconic acid-producing strains must be selected from these groups. Our invention is neither limited to any particular mycete, nor does it include every strain of any given mycete. On the other hand, every microorganism yet tried that will produce itaconic acid or its salts under any conditions will produce it better and more economically by our process, without preliminary acclimatization.

The advantages of our process for conducting the itaconic acid fermenation in a submerged but aerobic manner over the quiet-surface fermentation are many. Large surfaces of mycelium are not exposed to contamination by competing or parasitic organisms, and a pure culture fermentation can be more readily maintained. The acidity of the medium due to the production of itaconic acid during the course of the fermentation can be kept within any desired pH range by the addition of neutralizing agents, such as will occur to those skilled in the art. The temperature can be much more easily maintained at the optimum for fermentation. The fermentation is continued until no further appreciable production of itaconic acid occurs. The space required to produce a given amount of itaconic acid by our process is less than that which would be required for a fermenation of thin layers of liquor spread out in shallow trays. The fermenation liquor resulting from our process consists substantially of itaconic acid or its salts with traces of unfermented carbohydrate, nutrient salts, ets., but not more than traces of other organic acids, so that pure itaconic acid can be recovered from such liquors in an economical manner.

*Example 1.*—Two liters of a diluted molasses solution containing a mixture of sucrose and invert sugar or as sucrose, 196 g., 30 g. of sodium nitrate and 1.0 g. of sodium alginate was inoculated with 2.5 ml. of a suspension of a strain of *Aspergillus terreus* spores and kept at a temperature of 34–38° C. while agitated mechanically by means of a high-speed propeller-type stirrer, so that the micro-organism grew vigorously throughout the medium and the whole was thoroughly aerated. After seven days, the fermentation was stopped and the liquor was found to contain 48 g. of itaconic acid.

*Example 2.*—Forty-two grams of

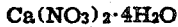

Ca(NO₃)₂·4H₂O and 1 g. sodium alginate were added to a carbohydrate solution containing 195 g. sucrose, together with suitable sources of combined phosphorus and potash and trace elements. The mixture was diluted with water to a volume of two liters and inocuated with 2.5 cc. of an aqueous suspension of the spores of an itaconic acid-producing mycete. The resulting fermentation liquor was so agitated and aerated at 34–38° C. as to promote submerged aerobic growth and fermentation for a period of two weeks. At the end of the run the liquor was found to contain 54 g. of itaconic acid.

We claim:

1. A process for the production of itaconic acid and its salts, comprising fermentation of a nutrient-containing carbohydrate solution by means of submerged areobic growth of an itaconic acid-producing mold selected from the group of genera consisting of Myxomycetes, Schizomycetes and Eumycetes.

2. A process for the production of itaconic acid and its salts, comprising fermenation of a nutrient-containing carbohydrate solution by means of submerged aerobic growth of an itaconic acid-producing Aspergillus.

3. A process for the production of itaconic acid and its salts, comprising fermeneation of a nutrient-containing carbohydrate solution by means of submerged aerobic growth of an itaconic acid-producing strain of *Aspergillus terreus*.

4. A process for the production of a member selected from the group consisting of itaconic acid and its salts comprising fermentation of an aqueous carbohydrate solution containing nutrient salts by means of submerged, aerobic growth of a mold selected from the group of genera consisting of Myxomycetes, Schizomycetes and Eumycetes.

5. A process for the production of a member selected from the group consisting of itaconic acid and its salts comprising fermentation of an aqueous carbohydrate solution containing nutrient salts by means of submerged, aerobic growth of an itaconic acid-producing Aspergillus.

6. A process for the production of a member selected from the group consisting of itaconic acid and its salts comprising fermentation of an aqueous carbohydrate solution containing nutrient salts by means of submerged, aerobic growth of an itaconic acid-producing strain of *Aspergillus terreus*.

7. A process for the production of a member selected from the group consisting of itaconic acid and its salts comprising fermentation of a carbohydrate substance which, after inoculation with an itaconic acid-producing Aspergillus, is mechanically agitated in such a manner as to promote submerged growth and fermentation.

JASPER H. KANE.
ALEXANDER C. FINLAY.
PHILIP F. AMANN.